United States Patent
Saccoccia (10) Patent No.: US 12,084,169 B2
(45) Date of Patent: Sep. 10, 2024

(54) RETRACTABLE BODY MOUNTED LANDING GEAR WITH SECONDARY CRASH ATTENUATION

(71) Applicant: SAFRAN LANDING SYSTEMS CANADA INC., Ajax (CA)

(72) Inventor: Michael Saccoccia, Seagrave (CA)

(73) Assignee: Safran Landing Systems Canada Inc., Ajax (CA)

( * ) Notice: Subject to any disclaimer, the term of this patent is extended or adjusted under 35 U.S.C. 154(b) by 1 day.

(21) Appl. No.: 18/049,941

(22) Filed: Oct. 26, 2022

(65) Prior Publication Data

US 2024/0140594 A1    May 2, 2024

(51) Int. Cl.
| | | |
|---|---|---|
| *B64C 25/20* | (2006.01) | |
| *B64C 25/26* | (2006.01) | |
| *B64C 25/34* | (2006.01) | |
| *B64C 25/58* | (2006.01) | |

(52) U.S. Cl.
CPC .......... *B64C 25/20* (2013.01); *B64C 25/26* (2013.01); *B64C 25/34* (2013.01); *B64C 25/58* (2013.01)

(58) Field of Classification Search
CPC ........ B64C 25/20; B64C 25/26; B64C 25/34; B64C 25/58; B64C 25/10; B64C 25/18; B64C 25/22; B64C 2025/345; B64C 25/60; B64C 25/12
See application file for complete search history.

(56) References Cited

U.S. PATENT DOCUMENTS

| | | | |
|---|---|---|---|
| 2,323,640 A | * | 7/1943 | Armstrong .............. B64C 25/10 244/102 R |
| 2,559,451 A | | 7/1951 | McBrearty |
| 3,179,368 A | * | 4/1965 | Whitten ................... A47C 3/26 248/563 |
| 3,265,163 A | | 8/1966 | Gilbert et al. |
| 3,997,133 A | | 12/1976 | Fagan |
| 5,294,077 A | | 3/1994 | Derrien |
| 2009/0057484 A1 | * | 3/2009 | White ..................... B64C 25/12 244/102 A |

(Continued)

OTHER PUBLICATIONS

Jackson, Karen E., "Advances in Rotorcraft Crashworthiness—Trends Leading to Improved Survivability," Journal of the American Helicopter Society, Apr. 2018, pp. 1-80, vol. 63, No. 2.

(Continued)

*Primary Examiner* — Assres H Woldemaryam
*Assistant Examiner* — Peter A Taraschi
(74) *Attorney, Agent, or Firm* — CHRISTENSEN O'CONNOR JOHNSON KINDNESS PLLC (57) ABSTRACT

A landing gear assembly for a vehicle, such as a helicopter, includes a linkage coupled to the vehicle and configured to reciprocate between a stowed position and a deployed position. A shock strut forms a part of the linkage. The landing gear assembly further includes a side brace having a first end coupled to the linkage and a second end coupled to the vehicle. The side brace provides a driving force that reciprocates the linkage between the stowed and deployed position. The side brace includes an energy attenuation system that dissipates energy when a compressive load on the side brace exceeds a predetermined threshold.

15 Claims, 11 Drawing Sheets

(56) References Cited

U.S. PATENT DOCUMENTS

| | | | |
|---|---|---|---|
| 2011/0133378 A1* | 6/2011 | Dunn | F16F 1/32 |
| | | | 267/217 |
| 2012/0168561 A1 | 7/2012 | Salmon et al. | |
| 2016/0144952 A1* | 5/2016 | Acks | B64C 25/20 |
| | | | 244/102 A |
| 2016/0221666 A1* | 8/2016 | Ataman | F15B 15/2838 |
| 2016/0221667 A1* | 8/2016 | Bennett | B64C 25/26 |
| 2018/0201365 A1* | 7/2018 | Acks | B64C 25/34 |
| 2019/0161175 A1* | 5/2019 | Satira | B64C 25/12 |
| 2020/0298964 A1* | 9/2020 | Di Leo | B64C 25/32 |
| 2021/0024203 A1* | 1/2021 | Chappell | F16F 13/002 |
| 2021/0291968 A1* | 9/2021 | Tischhauser | B64C 25/60 |

OTHER PUBLICATIONS

International Search Report and Written Opinion mailed Jan. 20, 2024, issued in corresponding International Application No. PCT/CA2023/051419, filed Oct. 25, 2023, 10 pages.

* cited by examiner

RETRACTABLE BODY MOUNTED LANDING GEAR WITH SECONDARY CRASH ATTENUATION

Most aircraft are equipped with landing gear that enables the aircraft to taxi, takeoff and safely land on the ground. Some aircraft, including helicopters, include landing gear that is retractable, i.e., the landing gear reciprocates between a deployed (extended) position and a stowed (retracted) position. While the vehicle is on the ground, the landing gear is deployed and supports the vehicle. In flight, the landing gear retracts, which reduces drag. The reduction in drag lowers fuel consumption and allows for higher cruise speeds.

In some types of landing gear, shock-absorbing struts are employed to absorb, damp and react forces or loads imposed on the landing gear during landing, taxiing, takeoff, and other operational conditions. Shock-absorbing struts, sometimes referred to as shock struts, generally accomplish these functions by compressing a fluid within a sealed chamber formed by hollow, telescoping cylinders. The fluid generally includes both a gas and a liquid, in which the liquid may take the form of hydraulic fluid or oil. One type of shock-absorbing strut is generally referred to as an "air-over-oil" or oleo-shock strut in which a trapped volume of gas is compressed, and a volume of the liquid is metered through an orifice in one of the telescoping cylinders when the shock strut is axially or longitudinally compressed. The gas operates as an energy storage device, similar conceptually to a mechanical spring, so that upon termination of a compressing force, for example, the shock strut returns to its original length. Shock struts also dissipate energy by passing the liquid through the orifice so that as the shock strut is compressed or extended, the rate of motion is limited by the damping action that occurs from the liquid being forced through the orifice.

In use, the shock strut supports the aircraft body during taxiing and take-off. The shock strut also absorbs impact energy and/or dampens shocks when the aircraft touches down after flight. When landing, the shock strut absorbs and/or dampens the landing impact energy and aims to prevent any "excessive" force from the landing from being transferred to the body of the aircraft.

Under normal operating conditions, that is, when the shock strut reacts to loads within its design capabilities, the shock strut functions to react and dampen loads imposed on the landing gear as mentioned above. In some instances, however, a landing generates abnormal or excessive loads, e.g., loads far exceeding the design capabilities of the shock strut, upon the aircraft. For example, abnormal or excessive loads may be caused by severely hard landings, crashes, etc. In these instances, conventional shock struts may be insufficient or ineffective in handling such abnormal loads and related impact energy.

SUMMARY

The present disclosure provides examples of a retractable landing gear with secondary crash attenuation. When a landing occurs at excess speed, such as a hard landing or crash-landing, the secondary crash attenuation supplements the energy dissipation of the landing gear that occurs under normal landing conditions. In an embodiment, the landing gear assembly includes a linkage coupled to the vehicle and configured to reciprocate between a stowed position and a deployed position. The linkage includes a shock strut. The landing gear assembly further includes a side brace having a first end coupled to the linkage and a second end coupled to the vehicle. The side brace provides a driving force that reciprocates the linkage between the stowed and deployed position. The side brace also includes an energy attenuation system that dissipates energy when a compressive load on the side brace exceeds a predetermined threshold.

In any embodiment, the linkage comprises an upper control arm rotatably coupled at a first end to the vehicle and rotatably coupled at a second end to a shock strut about a first axis. The linkage further includes a lower control arm rotatably coupled at a first end to the vehicle and rotatably coupled at a second end to a shock strut. A wheel is rotatably coupled to the shock strut. The upper control arm, the lower control arm, the shock strut, and the vehicle define a four-bar linkage.

In any embodiment, the first end of the side brace is rotatably coupled to the linkage about the first axis.

In any embodiment, the side brace comprises an upper brace rotatably coupled to a lower brace about a second axis, wherein the upper brace is coupled to the vehicle and the lower brace is coupled to the linkage.

In any embodiment, the upper brace is locked in rotation relative to the lower brace when the landing gear assembly is in the deployed position.

In any embodiment, a rod associated with one of the upper brace and lower brace extends into a recess associated with the other of the upper brace and lower brace to selectively lock the upper brace in rotation relative to the lower brace.

In any embodiment, the upper brace comprises a first portion slidingly engaging a second portion, a part of the first portion being at least partially disposed within a second portion, wherein the energy attenuation system comprises the first and second portions of the upper brace.

In any embodiment, the first and second portions define an internal chamber having a volume that changes as the first portion slides relative to the second portion.

In any embodiment, the energy attenuation system further comprises a fuse pin configured to prevent the first portion from sliding relative to the second portion.

In any embodiment, the fuse pin is configured to fail when a compressive force applied to the upper brace exceeds a predetermined threshold.

In any embodiment, the chamber is filled with a fluid and an orifice in the upper brace to provide fluid connection between the chamber and an environment surrounding the upper brace.

In any embodiment, a plug is disposed within the orifice to fluidly isolate the chamber from the environment.

In any embodiment, the plug is configured to be ejected from the orifice when a pressure in the chamber exceeds a predetermined threshold, compression of the upper brace metering the fluid through the orifice when the plug has been ejected from the orifice.

In any embodiment, the chamber is filled with a material, compression of the upper brace crushing the material when the fuse pin has failed.

In any embodiment, the material is a honeycomb material.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth herein in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion provides examples of a retractable landing gear with secondary crash attenuation suitable for use with vehicles, and aircraft in particular. In some examples, the secondary crash attenuation is activated when a compressive load on a side brace exceeds a predetermined threshold. In some examples, a portion of the side brace includes a fuse pin that prevents telescoping of a portion of the side brace, wherein telescoping of the side brace dissipates energy after the fuse pin has failed (fused).

FIGS. 1-11 illustrate various embodiments of a landing gear assembly 100 formed in accordance with aspects of the present disclosure. Embodiments of the landing gear assembly 100 are described as being used in conjunction with a vehicle 20, and in particular, a helicopter; however, it will be appreciated that the illustrated embodiments are exemplary only. Embodiments of the disclosed landing gear assembly 100 are suitable for use with fixed wing aircraft, vertical take-off and landing (VTOL) aircraft, magnetic levitation (maglev) vehicles or any other suitable vehicles that may utilize a retractable landing gear system, i.e., a landing gear configured to reciprocate between a stowed position and a deployed position.

Figure 1:
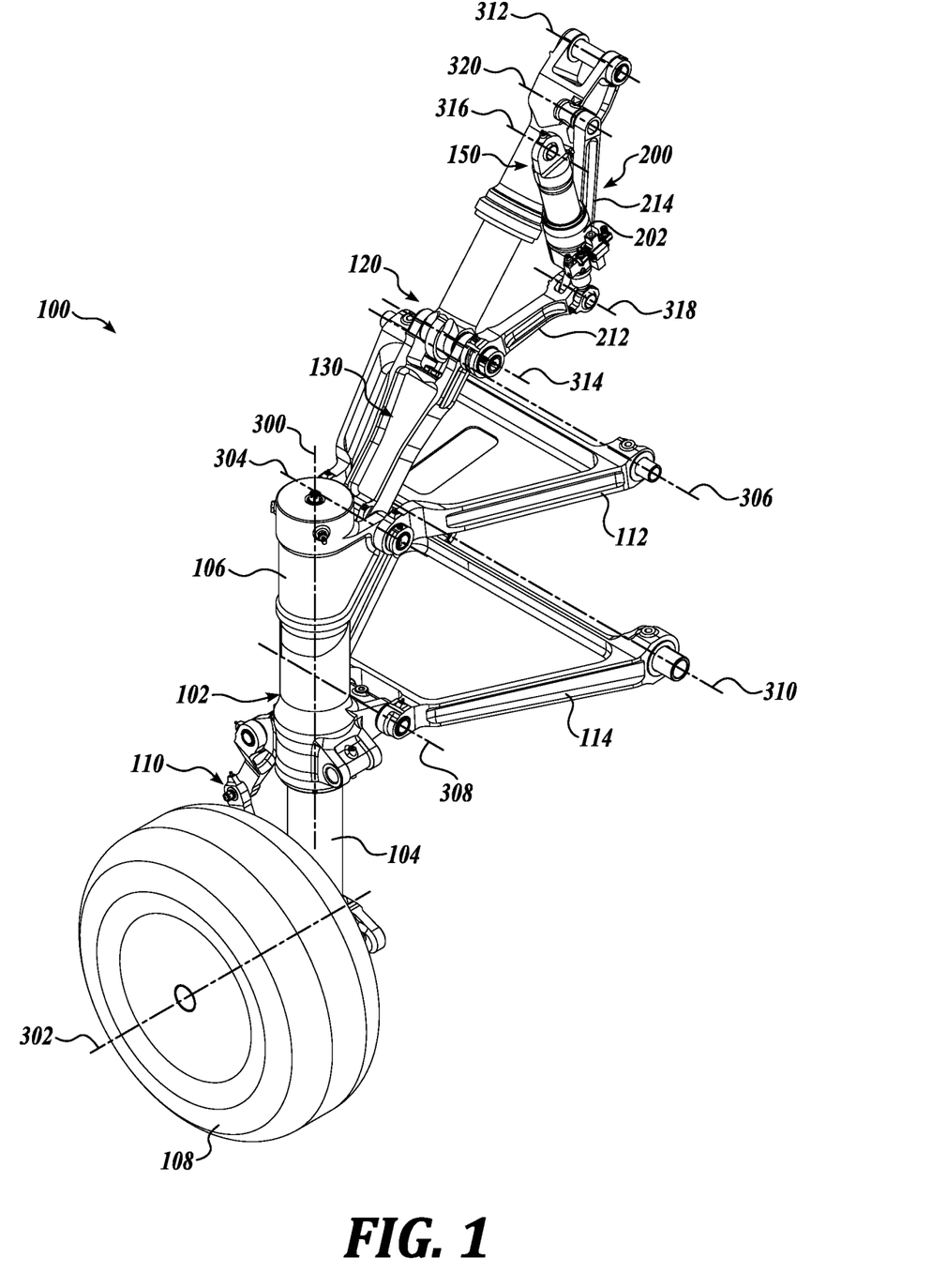
FIG. 1 shows an isometric view of a landing gear assembly in accordance with an embodiment of the present disclosure.
Figure 2:
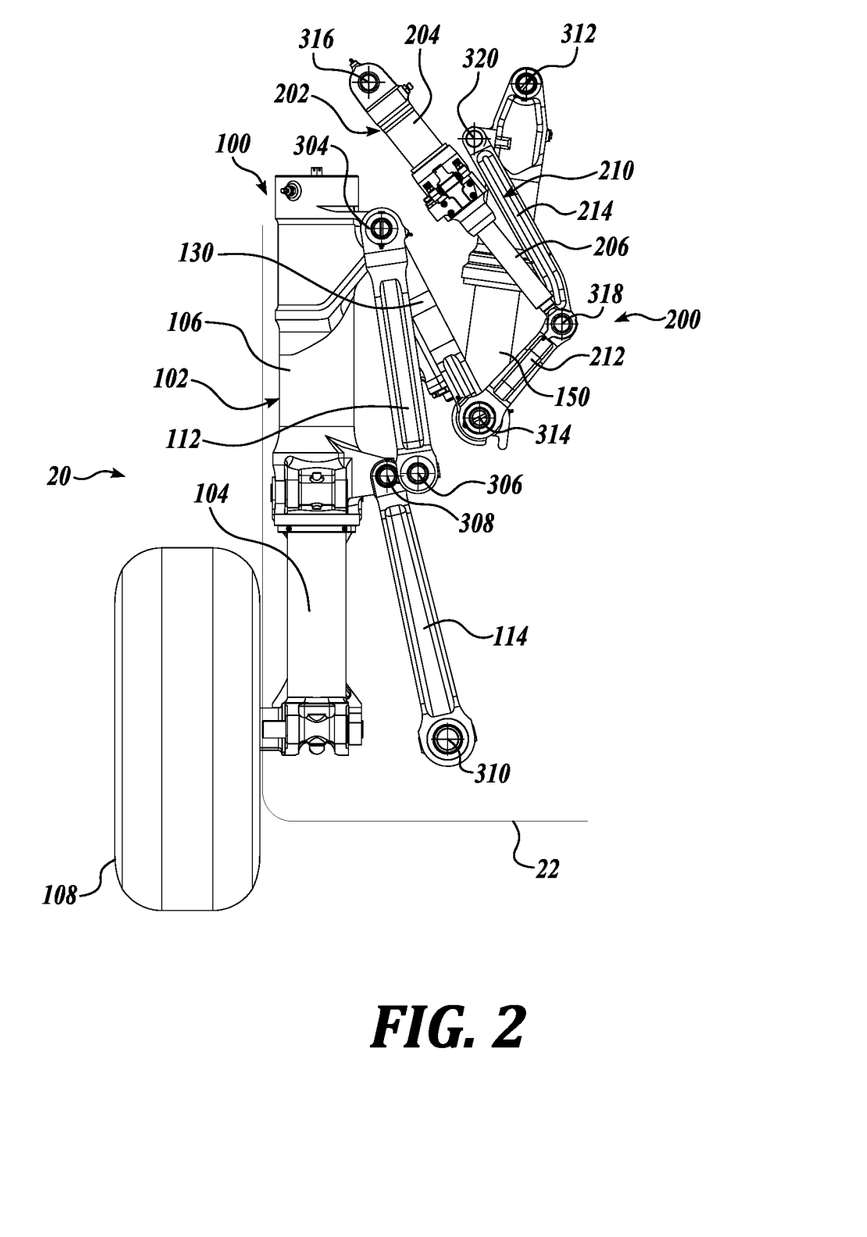
FIG. 2 shows a rear view of an aircraft with the landing gear assembly of FIG. 1, wherein the landing gear assembly is in a stowed position and a shock strut of the landing gear is in an extended state.
Figure 3:
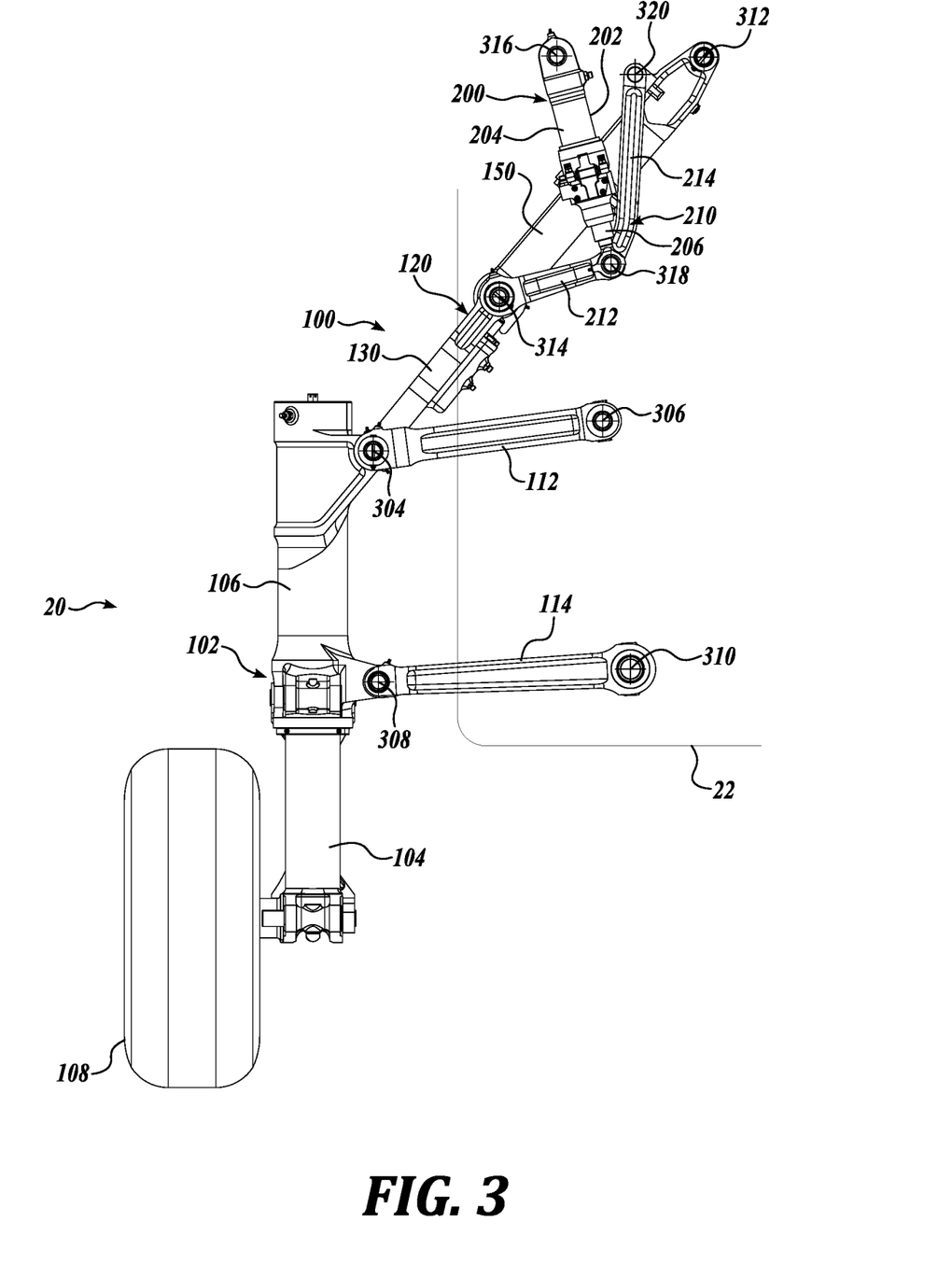
FIG. 3 is a rear view thereof, wherein the landing gear assembly is in a deployed position and the shock strut is in the extended state.

As shown in FIGS. 1-3, an embodiment of a landing gear assembly 100 includes a shock strut 102, for example, a known pneumatic air-oil hydraulic shock absorber used in aircraft landing gear. The shock strut 102 has a piston 104, a portion of which is slidably disposed within a cylinder 106 along centerline 300. A wheel 108 is rotatably coupled to the piston 104 about an axis 302 and at least partially supports the vehicle 20 when the vehicle is on the ground, e.g., when the vehicle 20 is taxiing or parked. A torque link assembly 110 prevents rotation of the piston 104 about a longitudinal axis relative to the cylinder 106. The shock strut 102 acts as a shock absorber that cushions landing/taxiing impact forces while damping resulting oscillations.

The strut 102 and wheel 108 are coupled to the vehicle by an upper control arm 112 and a lower control arm 114. The upper control arm 112 is rotatably coupled to the shock strut 102 about axis 304 and to the vehicle 20 about axis 306, which is parallel to axis 304. Similarly, the lower control arm 114 is rotatably coupled to the strut 102 about axis 308, which is parallel to axis 304. The lower control arm 114 is also rotatably coupled to the vehicle 20 about axis 310, which is parallel to axis 308. Because axes 306 and 310 are fixedly positioned relative to the vehicle 20, the shock strut 102 and the upper and lower control arms 112 and 114 act as part of a 4-bar linkage that controls extending and retracting motion of the landing gear assembly. In other words, the upper and lower control arms 112, 114 and the vehicle 20 cooperate to act as a linkage that provides reciprocating movement of the shock strut 102 between an extended position and a retracted position. While embodiments of a landing gear assembly are described herein as having a shock strut and control arms to control the motion of the landing gear assembly during extension and retraction, it will be appreciated that any number or suitable landing gear configurations may be utilized with embodiments of the present disclosure, and such configurations should be considered within the scope of the present disclosure.

In some embodiments, the side brace assembly 120 is rotatably coupled at a first end to the shock strut 102 about axis 304, i.e., rotation of the side brace assembly 120 relative to the shock strut 102 is coaxial with rotation of the upper control arm 112 relative to the shock strut. In some embodiments, the side brace assembly 120 is coupled to the shock strut 102 about an axis that is offset from and/or nonparallel to axis 302. As will be described in further detail, the side brace assembly 120 includes an actuator assembly 200 that drives reciprocating motion of the landing gear assembly 100 between the stowed position (FIG. 2) and deployed position (FIG. 3).

The side brace assembly 120 includes an elongate lower brace 130 coupled to an elongate upper brace 150 for selective rotation about axis 314. The side brace assembly 120 is selectively lockable so that when the side brace is locked, the lower brace 130 is fixedly positioned relative to the upper brace 150, and when the side brace is unlocked, the lower brace 130 is rotatable relative to the upper brace 150 about axis 314. The side brace assembly 120 also provides secondary crash attenuation. That is, the side brace assembly 120 provides additional energy absorption capability in the event that high descent rates, such as crash conditions, require energy absorption beyond the capability of the shock strut 102.

Still referring to FIGS. 1-3, an actuator assembly 200 drives the reciprocating motion of the landing gear assembly 100 between the stowed position and the deployed position. In the illustrated embodiment, the actuator assembly 200 includes a linear actuator 202 coupled to a toggle linkage 210. The toggle linkage 210 includes a lower toggle link 212 having one end rotatably coupled to the side brace assembly 120 about the axis 314 of the rotational joint between the lower brace 130 and the upper brace 150. A second end of the lower toggle link 212 is rotatably coupled to a first end of an upper toggle link 214 about axis 318. A second end of the upper toggle link 214 is rotatably coupled to the upper brace 150 about axis 320. As will be explained in further detail, under normal operating conditions, the upper brace 150 maintains a constant length. Accordingly, axes 320 and 314 maintain a fixed distance from each other, and the toggle linkage 210 remains fixedly positioned relative to the upper brace 150. That is, the lower toggle link 212 and the upper toggle link 214 are constrained to maintain a fixed relationship to each other and to the upper brace 150.

The linear actuator 202 includes a housing 204 rotatably coupled to the vehicle 20 about an axis 312. The linear actuator 202 further includes a rod 206, a portion of which is slidable disposed within the housing 204. The rod 206 is rotatably coupled to the toggle linkage 210 about axis 318. Extension of the actuator 202 drives rotation of the toggle linkage 210 and the upper brace 150 in a counterclockwise direction about axis 312 as viewed in FIGS. 2 and 3. Conversely, retraction of the actuator 202 drives rotation of the toggle linkage 210 and the upper brace 150 in a clockwise direction about axis 312 as viewed in FIGS. 2 and 3. While the illustrated actuator is a linear actuator, it will be appreciated that some embodiments may utilize a rotary actuator or any other suitable type of actuator.

Referring now to FIGS. 7-10, the side brace assembly 120 will be described in further detail. As previously noted, the side brace assembly 120 includes a lower brace 130 rotatably coupled to an upper brace 150 about axis 318. A locking feature 122 selectively fixes the lower brace 130 and upper brace 150 in rotation relative to each other about axis 318.

Figure 9:
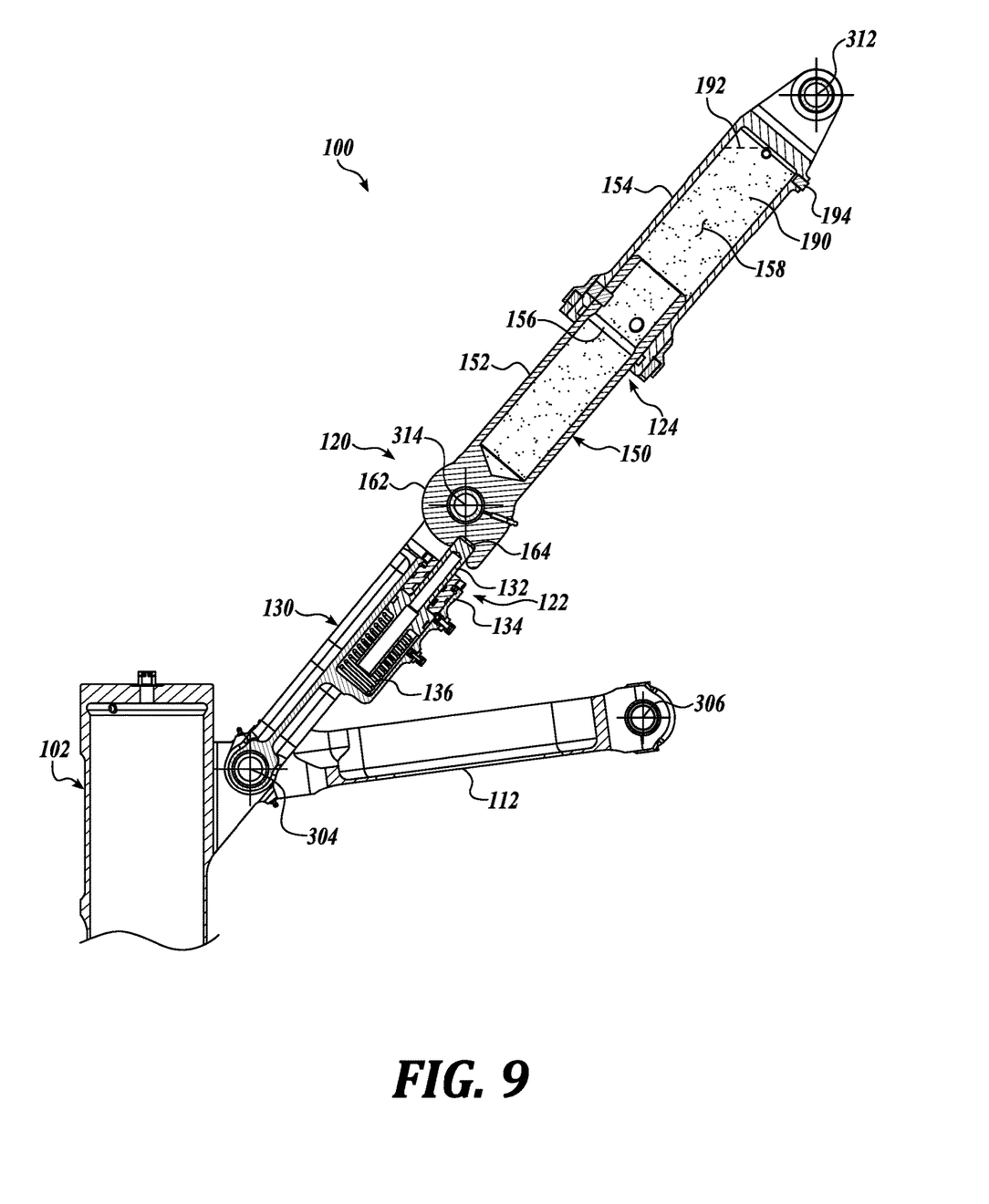
FIG. 9 is a cross-sectional view thereof, wherein the landing gear assembly is in the deployed position.

As shown in FIG. 9, when the landing gear assembly 100 is in a deployed position, the locking feature 122 prevents rotation of the lower brace 130 and the upper brace 150 relative to each other. In an embodiment, the lower brace 130 includes a locking pin 132 that selectively extends from the end of the lower brace proximate to the upper brace 150. The lower brace 130 further includes an actuator 134 configured to selectively retract and extend the locking pin 132. The actuator 134 has a biasing element 136, such as a compression spring configured to bias the locking pin 132 toward an extended position so that the locking pin assumes and maintains the extended position when the actuator 134 is not energized.

Figure 10:
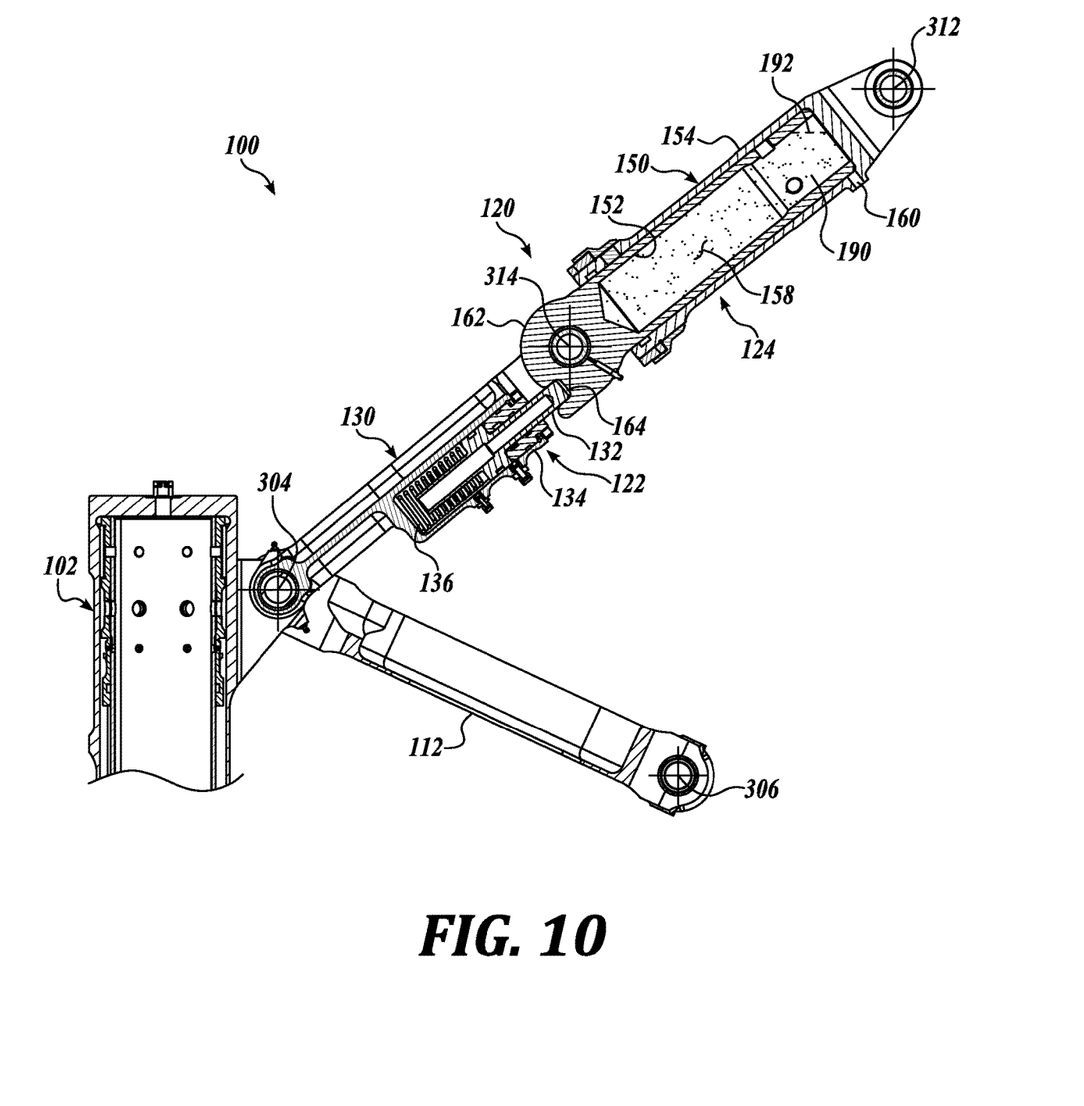
FIG. 10 is a cross-sectional view thereof, wherein the landing gear assembly is in the deployed position and the aircraft has experienced a landing with excess vertical speed, e.g., a crash.

The upper brace 150 includes a recess sized and positioned to receive the extended locking pin 132. When the locking pin 132 is extended into the recess 164, as shown in FIG. 10, rotation of the upper brace 150 relative to the lower brace 130 about axis 318 is prevented. When the locking pin 132 is in the retracted position, the locking pin is disengaged from the recess 164, and the upper brace 150 is rotatable relative to the lower brace 130 about axis 318. Movement of the locking pin 132 from the extended position to the retracted position also compresses the biasing element 136.

Figure 8:
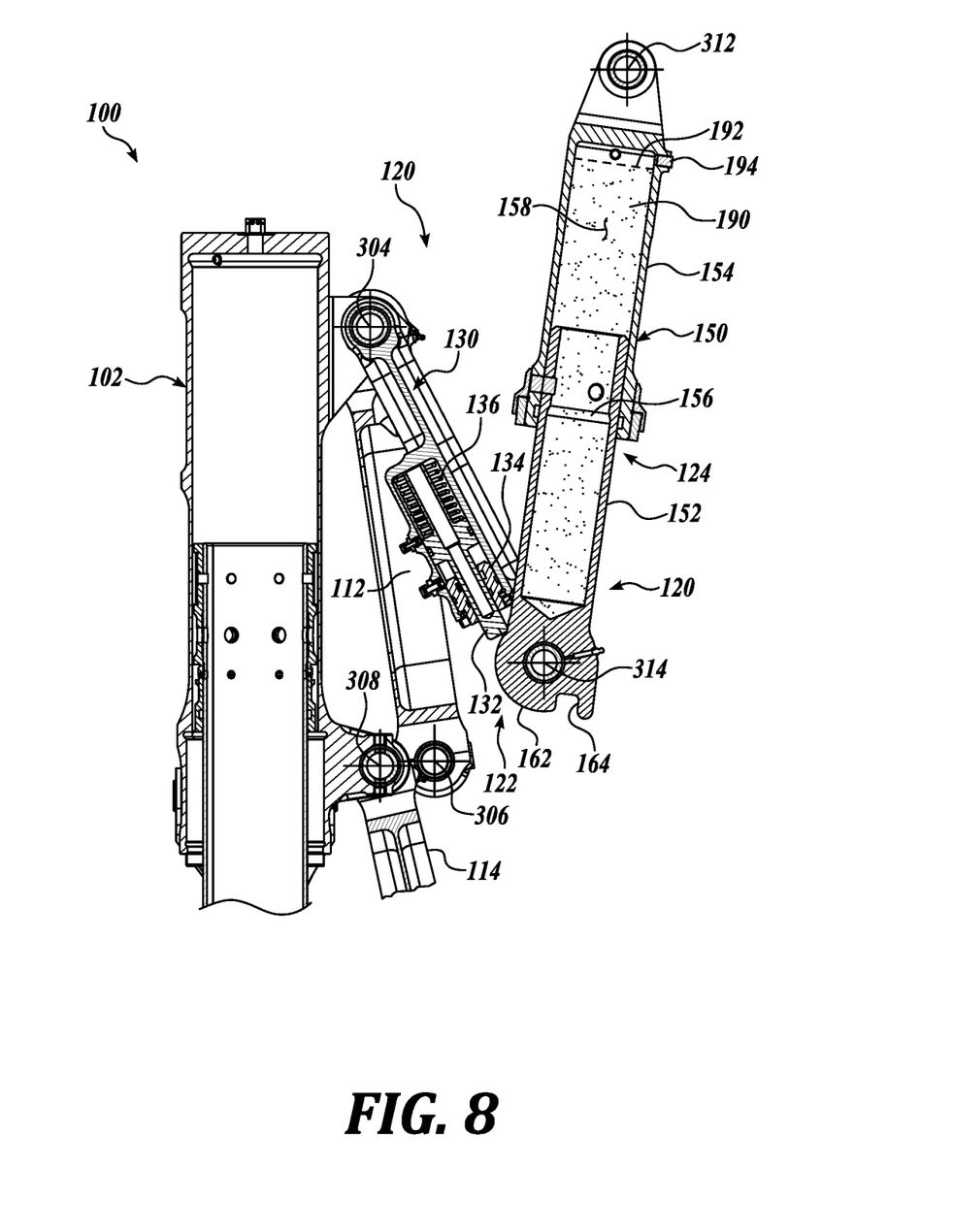
FIG. 8 is a cross-sectional view of the side brace shown in FIG. 7, wherein the landing gear assembly is in the stowed position.

To enable the landing gear assembly 100 to move from the extended position shown in FIG. 9 to the retracted position shown in FIG. 8, the actuator 134 is energized and retracts the locking pin 132 against the force of the biasing element 136 to disengage locking pin from the recess 164. In some embodiments, the actuator is energized by hydraulic pressure via the hydraulic port on the side of the actuator nearest axis 314, wherein the pressure comes from the same source as that pushing on the head side of the retract actuator. With the locking pin 132 disengaged from the recess 164, the upper brace 150 and lower brace 130 are rotatable relative to each other about axis 318 as part of the landing gear assembly 100 retraction motion that moves the landing gear assembly from the extended state, shown in FIG. 9, to the retracted state, shown in FIG. 8. Once the landing gear assembly 100 has reached the retracted position, the actuator 134 is de-energized, e.g., the pressure in the actuator is removed, and the locking pin 132 extends under the biasing force of the biasing element 136 until the locking pin contacts a cam surface 162 formed on the upper brace 150.

When the landing gear assembly 100 moves from the retracted position of FIG. 8 to the extended position of FIG. 9, the upper brace 150 and lower brace 130 rotate relative to each other about axis 318. As the upper brace 150 and lower brace 130 rotate relative to each other, the locking pin 132 maintains sliding contact with the cam surface 162 under the biasing force of the biasing element 136. In some embodiments, the actuator 134 is a dual acting actuator, and additional biasing force is provided by hydraulic pressure within the actuator. The locking pin 132 continues to slide along the cam surface 162 until the landing gear assembly reaches the deployed position of FIG. 9, at which point the locking pin 132 extends into the recess 164 under the biasing force of the biasing element 136. With the locking pin 132 extending into the recess 164, the upper brace 150 and lower brace 130 remain locked in rotation relative to each other about axis 318.

In an alternate release (AES) condition pressure is applied to retract the actuator 134 via a secondary hydraulic source or 'nitrogen blow down'. The landing gear assembly 100 is pushed into the down and locked position, in which the biasing element 136 in actuator 134 pushes the locking pin 132 into the recess 164 provided either head pressure only, equal pressure, or no pressure is applied to actuator 134. The unequal area of the actuator 134 will force the locking pin 132 into place if equal pressure is applied at the annular and head ports simultaneously.

Still referring to FIGS. 8 and 9, the upper brace 150 includes an embodiment of an energy attenuation system 124 that dissipates excess kinetic energy when the kinetic energy of the landing vehicle 20 is beyond the capability of the shock strut 102 of the landing gear assembly 100. That is, when a vehicle 20 is descending too quickly, such as in a crash scenario, the energy attenuation system 124 provides additional energy dissipation that supplements the energy dissipation capability of the shock strut 102.

The upper brace 150 includes a first portion 152, a part of which is slidably disposed within a second portion 154 in a telescoping manner. The outer surface of the first portion 152 sealingly engages the inner surface of the second portion 154 so that the first and second portions act as a piston and cylinder, respectively, and cooperate to define an internal chamber 158. In some embodiments, seals, such as O-rings are positioned between the first portion 152 and the second portion 154 to provide a fluidic seal between the portions.

A fuse pin 156 extends laterally through the first portion 152 and second portion 154 to block translational movement of the first portion relative to the second portion. The fuse pin 156 is designed to shear, i.e., fail when the upper brace 150 is subjected to a predetermined axial load. More specifically, the fuse pin 156 is designed to shear when the upper brace 150 is subjected to a predetermined compressive load resulting from excessive vertical speed during a landing. In some embodiments, the upper brace 150 includes multiple fuse pins configured to provide failure at the predetermined axial load.

An orifice 160 extends through the wall of the upper brace 150 to provide fluid communication between the chamber 158 and the environment. Under normal operating conditions, an oil relief fuse plug 194 seals the orifice 160. The fuse plug 194 is configured to disengage from the orifice 160 when pressure within the chamber 158 exceeds a predetermined threshold.

In some embodiments, the chamber 158 with a fluid 190, such as, for example, oil or any suitable hydraulic fluid. In some embodiments, the chamber 158 is further charged with an amount of low-pressure inert gas 192, such as nitrogen, to keep the seals energized. It will be appreciated that the chamber 158 can be filled with any fluid or combination of fluids suitable for providing damping capability when the energy attenuation system 124 is activated as described below.

Operation of the landing gear assembly 100 under normal conditions will now be described with reference to FIGS. 2-4, 8, and 9. Under normal operating conditions, the, the fuse pin 156 prevents translation of the first portion 152 of the upper brace 150 relative to the second portion 154 of the upper brace. As a result, the upper brace 150 maintains a constant length, and the distance between axes 312 and 314 remains fixed. Further, because the upper brace 150 maintains a fixed length during normal operations, the lower toggle link 212 and the upper toggle link 214 both maintain a fixed position relative to the upper brace 150. That is, the upper brace 150 and the toggle linkage 210 act as a single unit during normal operation.

Beginning with FIGS. 2 and 8, the landing gear assembly 100 is shown in a retracted position with the vehicle 20 in flight. In the retracted position, the shock strut 102 and wheel 108 are raised relative to the vehicle 20. In the illustrated embodiments, the shock strut 102 is positioned within the outer mold line (OML) of the fuselage 22 of the vehicle 20, and the wheel 108 is located proximate to the OML. In some embodiments, the wheel 108 and/or shock strut 102 are outside, inside, or partially inside the OML.

As best shown in FIG. 2, in the stowed position, the actuator 202 is in an extended and locked position. As a result, the actuator 202 controls the position of the upper brace 150 by virtue of the connection of the actuator rod 206 to the toggle linkage 210. The locking pin 132 of the side brace locking feature 122 is disengaged from the recess 164, so that the side brace is in an "unlocked" position, i.e., the lower brace 130 and the upper brace 150 are rotatable relative to each other about axis 314 as the landing gear assembly 100 moves toward the deployed position.

To move from the stowed position of FIGS. 2 and 8 to the deployed position of FIGS. 3 and 9, the actuator assembly 200 retracts, i.e., the actuator rod 206 retracts into the actuator housing 204, shortening the distance between axes 316 and 318. The retraction of the actuator assembly 200 rotates the upper brace 150 in a clockwise direction (as viewed in FIGS. 2 and 3) about axis 312, the position of which is fixed relative to the vehicle 20. The clockwise rotation of the upper brace 150 drives rotation of the lower brace 130 in a counterclockwise direction relative to the upper brace about axis 314. That is, the side brace assembly 120 "straightens out" as the upper brace 150 and the lower brace 130 become aligned.

As the side brace assembly 120 extends, the distance between axis 312 (which is fixed relative to the vehicle 20) and axis 304 increase, and axis 304 moves in an outboard and downward direction relative to the vehicle. The movement of axis 304 rotates the upper control arm 112 and the lower control arm 114 in a counterclockwise direction, thereby moving the shock strut 102 and the wheel 108 in an outboard and downward direction.

While the upper brace 150 and lower brace 130 move toward the aligned position, the actuator 134 biases the locking pin 132 of the lower brace 130 against the cam surface 162 of the upper brace 150. The locking pin 132 slides along the cam surface 162 until the locking pin reaches the recess 164 in the upper brace 150, at which point the locking pin extends into the recess. With locking pin 132 engaging the recess 164, the lower brace 130 and upper brace 150 are aligned and rotationally fixed relative to each other about axis 318. When so-positioned, the side brace assembly 120 is fully extended, and the landing gear assembly 100 is in the deployed position of FIG. 9.

To move the landing gear assembly 100 from the deployed position to the stowed position, the actuator 134 temporarily retracts the locking pin 132 from the recess 164, and the actuator assembly 200 begins to extend the actuator rod 206 from the actuator housing 204. The extension of the actuator rod 206 rotates the upper brace 150 in a counterclockwise direction (as viewed in FIG. 3). This rotation folds the side brace assembly 120 about axis 314 which shortens the distance between axis 304 and axis 312. As this distance decreases, the side brace assembly 120 drives rotation of the upper control are arm 112 in a clockwise direction, thereby raising the shock strut 102 and wheel 108 in an upward and inboard direction. This upward and inboard motion continues until the landing gear assembly 100 has reached the stowed position. With the landing gear assembly 100 in the stowed position, the actuator assembly 200 locks, preventing accidental deployment of the landing gear assembly 100.

Referring now to FIGS. 2-6, a crash-landing sequence of the vehicle 20 will be described. In FIG. 2, the landing gear assembly 100 is in the retracted position, and the vehicle 20 is in flight.

In preparation for a landing, the landing gear assembly 100 is deployed, as shown in FIG. 3. With the landing gear assembly 100 deployed and the vehicle 20 still in flight, the landing gear assembly does not support the vehicle, and the shock strut 102 is fully extended.

Figure 4:
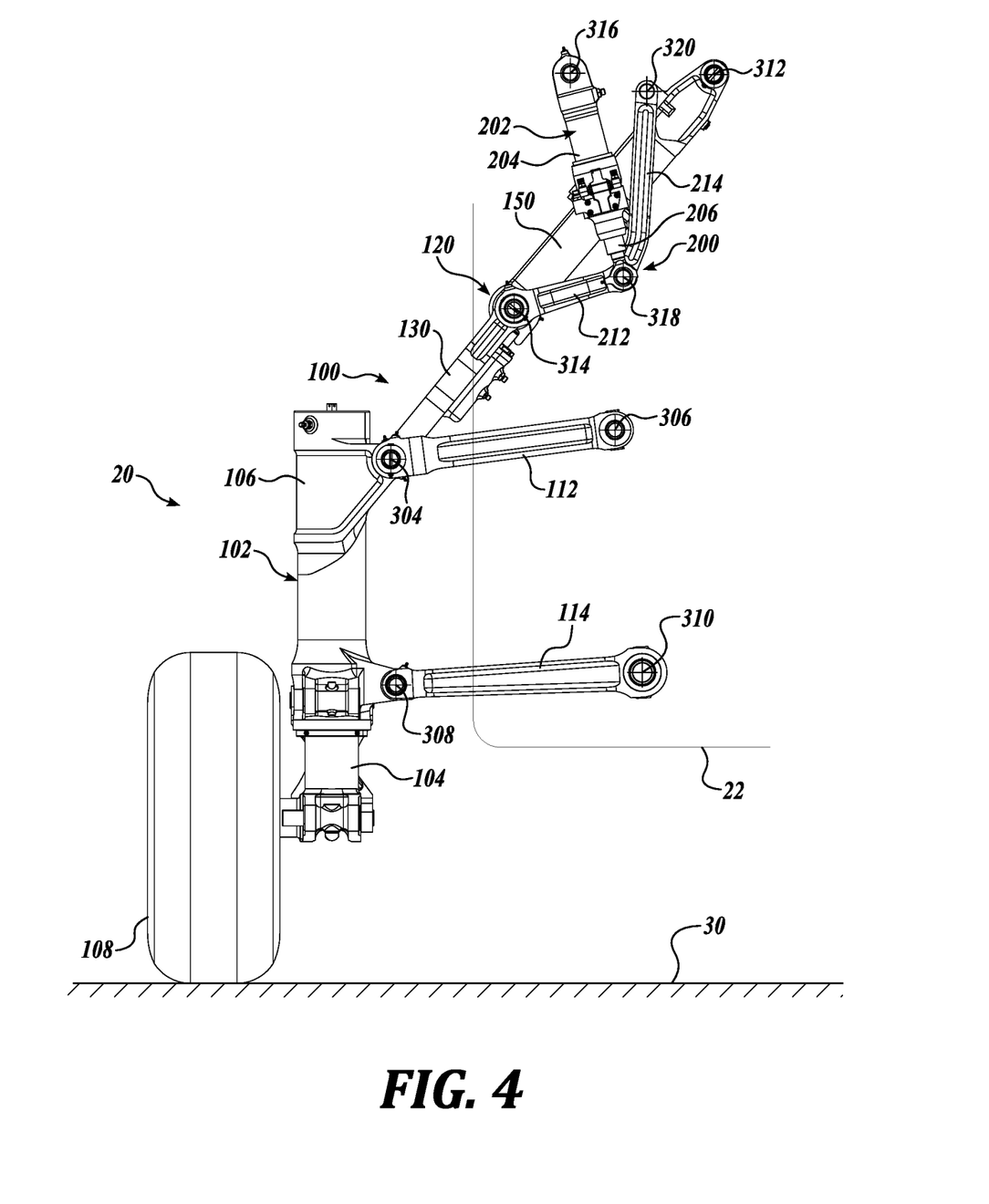
FIG. 4 is a rear view thereof, wherein the landing gear assembly is in contact with the ground and the shock strut is in a partially compressed state.

In FIG. 4, the landing gear assembly 100 has contacted the ground 30, and the shock strut 102 has started to compress under the weight of the vehicle 20. During a normal landing, the shock strut 102 compresses until the vehicle 20 is fully supported. During a crash sequence, the vehicle 20 continues moving downward, further compressing the shock strut 102.

Figure 5:
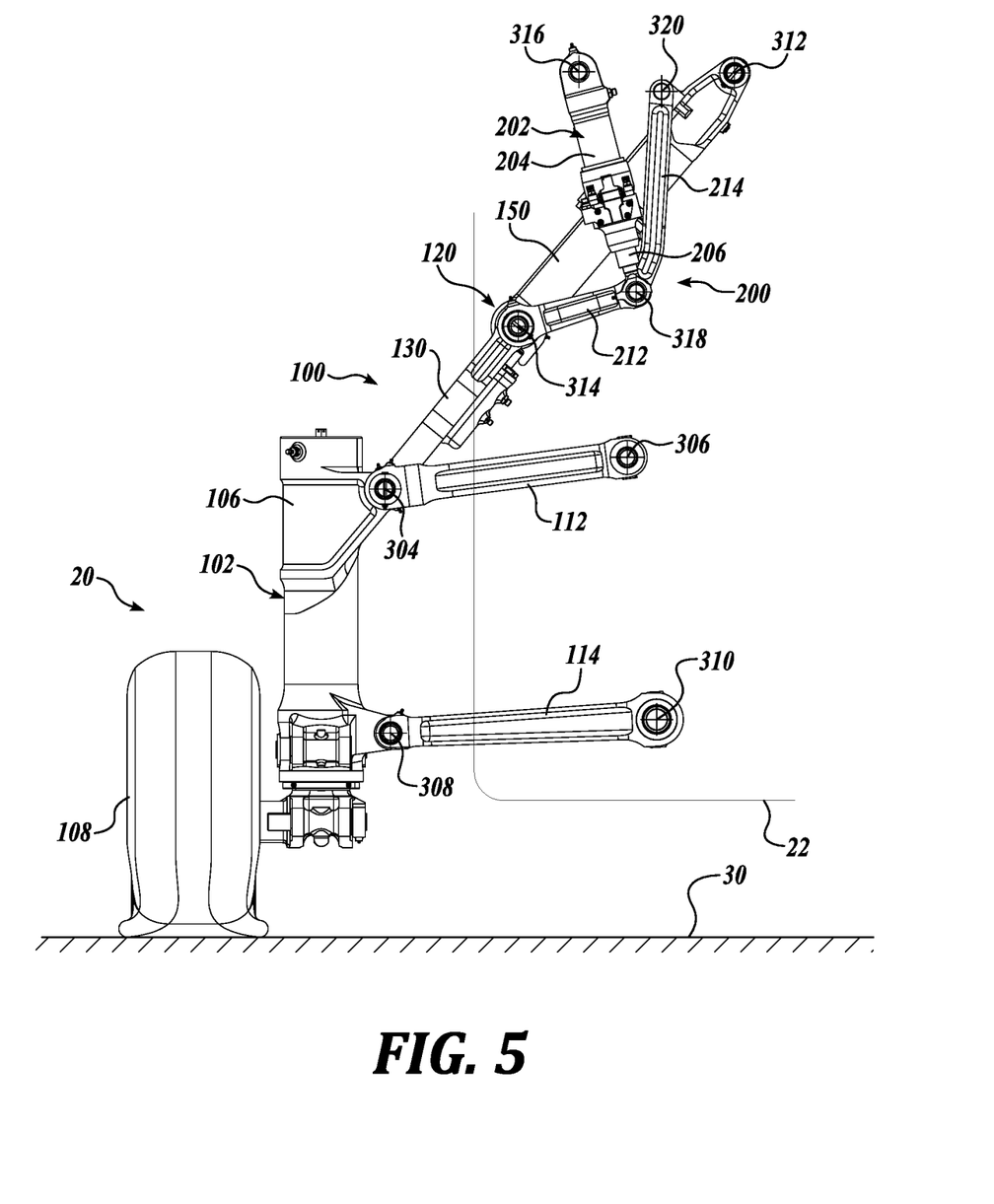
FIG. 5 is a rear view thereof, wherein the shock strut is in a fully compressed state.

In FIG. 5, the shock strut 102 and wheel 108 have fully compressed due to the downward velocity of the vehicle. For known landing gear assemblies, further downward movement by the vehicle would cause structural damage to the landing gear and the vehicle in general. However, embodiments of the disclosed energy attenuation system 124 provide additional energy dissipation that prevents or reduces structural damage.

Figure 6:
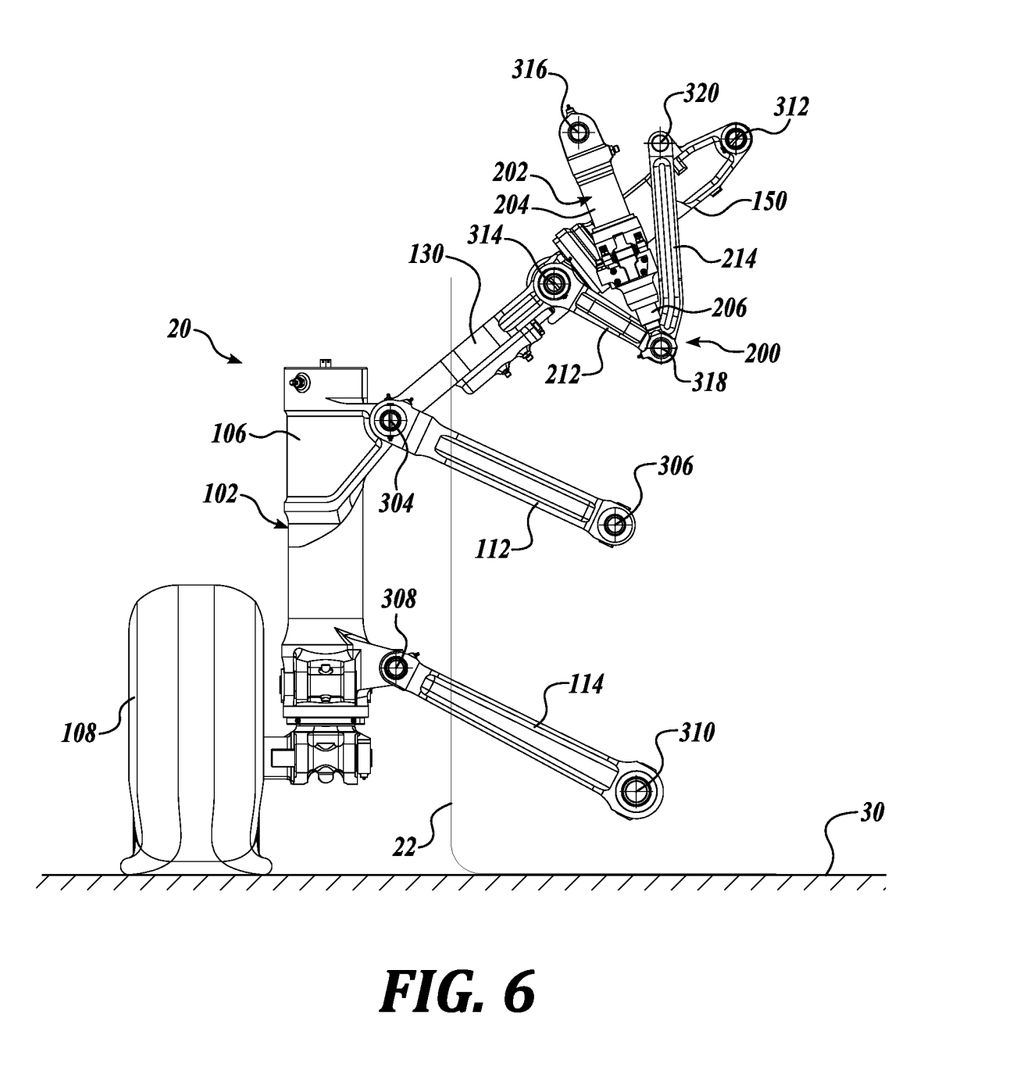
FIG. 6 is a rear view thereof, wherein the shock strut is in a fully compressed state, the energy attenuation system is fully compressed, and the aircraft fuselage is in contact with the ground.
Figure 7:
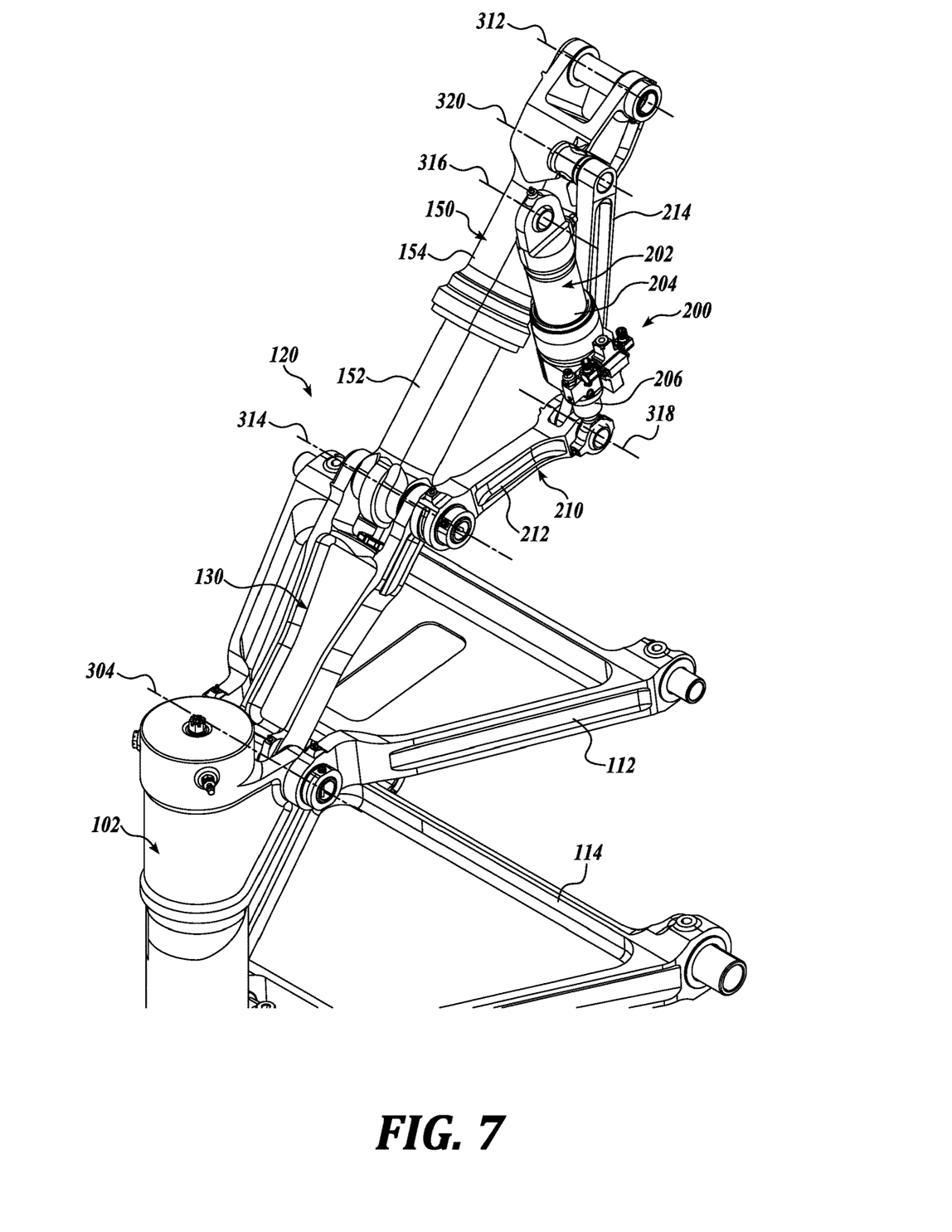
FIG. 7 is a partial isometric view of a side brace of the landing gear assembly shown in FIG. 1.

In FIG. 6, the energy attenuation system 124 of landing gear assembly 100 has been activated by a crash landing. When the shock strut 102 and the wheel 108 have bottom out, at least some of the remaining kinetic is reacted as a compressive impact load on the side brace assembly 120.

If the compressive load on the side brace assembly 120 does not exceed a predetermined limit, the energy attenuation system 124 is not activated. If the compressive load on the side brace assembly 120 exceeds the predetermined limit, then the energy attenuation system 124 is activated and further dissipates energy from the vehicle 20 to decrease the energy of the crash.

Referring to FIG. 9, when the side brace assembly 120 is subjected to compressive loads, the first portion 152 of the upper brace 150 is urged toward the second portion 154 of the upper brace. Under normal operating conditions, i.e., when the compressive load on the side brace assembly 120 is below the predetermined limit, the fuse pin 156 maintains the position of the first and second portions 152, 154 relative to each other. However, in the event of a high velocity landing or crash landing, the compressive load on the side brace assembly 120 may exceed the predetermined limit.

The energy attenuation system 124 is configured to activate when compressive loads in the side brace assembly 120 exceed the predetermined limit. In this regard, the fuse pin 156 (or plurality of fuse pins) is designed to fail when the compressive load exceeds the predetermined limit. After the fuse pin fails, the compressive force moves the first portion 152 of the upper brace 150 towards the second portion 154 of the upper brace. This movement reduces the size of the chamber 158 formed in the upper brace 150, which in turn increases the pressure in the chamber.

When the pressure in the chamber 158 exceeds a predetermined limit, the pressure drives the fuse plug 194 out of the orifice 160 so that the chamber 158 is in fluid communication with the surrounding atmosphere. With the orifice 160 unplugged, the compressive load on the side brace assembly 120 collapses the upper brace 150 so that the fluid 190 is forced out of the orifice 160. Similar to known shock absorbers, metering the fluid 190 through the orifice 160 provides a damping force that attenuates energy during a high velocity/crash landing.

As shown in FIG. 10, when the upper brace 150 is completely collapsed, the first portion 152 covers the orifice 160. As a result, the chamber 158 is fluidly isolated from the surrounding environment, an no additional fluid 190 is discharged from the upper brace 150.

Figure 11:
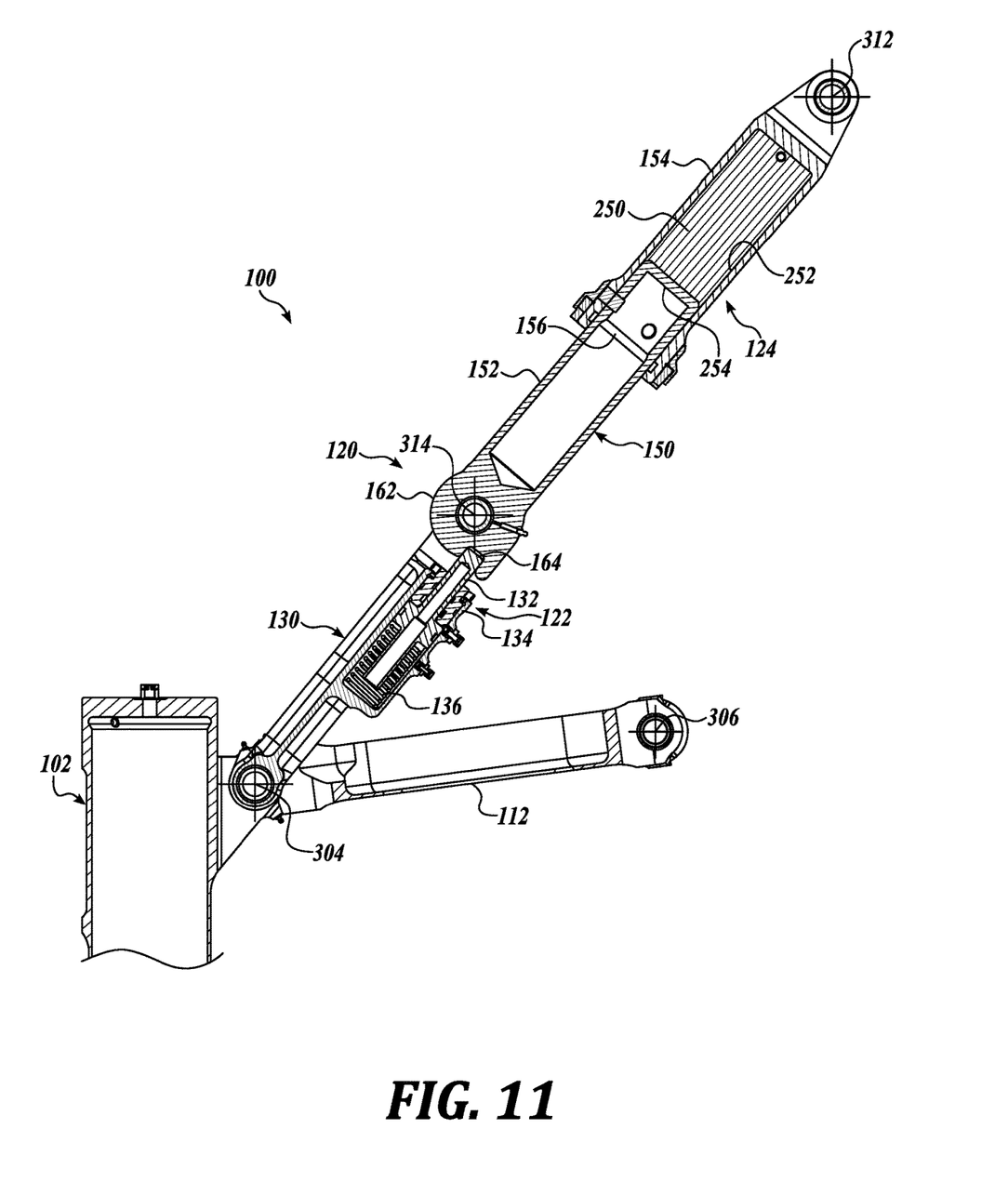
FIG. 11 is a cross-sectional view of another embodiment of the side brace shown in FIG. 7, wherein the landing gear assembly is in the deployed position.

FIG. 11 shows another embodiment of the energy attenuation system 124 shown in FIGS. 8-10. The energy attenuation system 124 is similar to the previously described system except that a plug 250 made of a honeycomb material fills a chamber 252 within the upper brace 150. The first portion 152 of the upper brace 150 includes end wall 254 that cooperates with the second portion 154 of the upper brace 150 to define the chamber 252. During a high-velocity/ crash landing, the plug 250 is crushed by the collapsing upper brace 150 after the fuse pin 156 fails. In some embodiments, the plug 250 is at least partially formed from a honeycomb material. Honeycomb material is known to provide energy dissipation when crushed (compressed) and provides generally constant resistance throughout the crushing event. In some embodiments, the plug 250 is made of any suitable material that dissipates energy when crushed.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A vehicle, comprising:
   a fuselage; and
   a landing gear assembly, comprising:
      a linkage coupled to the fuselage and configured to reciprocate between a stowed position and a deployed position, the linkage comprising a shock strut;
      a side brace configured to provide a driving force that reciprocates the linkage between the stowed and deployed position, the side brace including:
         a lower brace with a first end coupled to the linkage; and
         an upper brace with a first end rotatably coupled to the fuselage, a second end of the upper brace being rotatably coupled to a second end of the lower brace about a first axis, the upper brace having an energy attenuation system that enables the first end of the upper brace to move toward the second end of the upper brace to dissipate energy when a compressive load on the side brace exceeds a predetermined threshold; and an actuator assembly including:
- an upper toggle link with a first end rotatably coupled to the first end of the upper brace;
- a lower toggle link with a first end rotatably coupled to the second end of the upper brace, a second end of the lower toggle link being rotatably coupled about a second axis to a second end of the upper toggle link; and
- a linear actuator rotatably coupled at a first end to the fuselage and rotatably coupled at a second end to at least one of the upper toggle link and the lower toggle link.

2. The vehicle according to claim 1, wherein the linkage comprises:
- an upper control arm rotatably coupled at a first end to the fuselage and rotatably coupled at a second end to the shock strut about a first axis;
- a lower control arm rotatably coupled at a first end to the fuselage and rotatably coupled at a second end to a shock strut, and
- a wheel rotatably coupled to the shock strut,
wherein the upper control arm, the lower control arm, the shock strut, and the fuselage define a four-bar linkage.

3. The vehicle according to claim 2, wherein the first end of the lower brace is rotatably coupled to the linkage.

4. The vehicle according to claim 3, wherein the upper brace is locked in rotation relative to the lower brace when the landing gear assembly is in the deployed position.

5. The vehicle according to claim 4, wherein a rod associated with one of the upper brace and lower brace extends into a recess associated with the other of the upper brace and lower brace to selectively lock the upper brace in rotation relative to the lower brace.

6. The vehicle according to claim 1, wherein the upper brace comprises a first portion slidingly engaging a second portion, a part of the first portion being at least partially disposed within a second portion, wherein the energy attenuation system comprises the first and second portions of the upper brace.

7. The vehicle according to claim 6, wherein the first and second portions define an internal chamber having a volume that changes as the first portion slides relative to the second portion.

8. The vehicle according to claim 7, wherein the energy attenuation system further comprises a fuse pin configured to prevent the first portion from sliding relative to the second portion.

9. The vehicle according to claim 8, wherein the fuse pin is configured to fail when a compressive force applied to the upper brace exceeds a predetermined threshold.

10. The vehicle according to claim 9, wherein the chamber is filled with a fluid and, an orifice in the upper brace provides fluid connection between the chamber and an environment surrounding the upper brace.

11. The vehicle according to claim 10, wherein a plug is disposed within the orifice to fluidly isolate the chamber from the environment.

12. The vehicle according to claim 11, wherein the plug is configured to be ejected from the orifice when a pressure in the chamber exceeds a predetermined threshold, compression of the upper brace discharging fluid through the orifice when the plug has been ejected from the orifice.

13. The vehicle according to claim 9, wherein the chamber is filled with a material, compression of the upper brace crushing the material when the fuse pin has failed.

14. The vehicle according to claim 13, wherein the material is a honeycomb material.

15. The vehicle according to claim 1, wherein the linear actuator is rotatably coupled at the second end to the to at least one of the upper toggle link and the lower toggle link about the second axis.

\* \* \* \* \*